April 8, 1941. L. M. POTTS 2,237,951
MOTOR CONTROL AND PHASING
Filed July 3, 1937 2 Sheets-Sheet 1
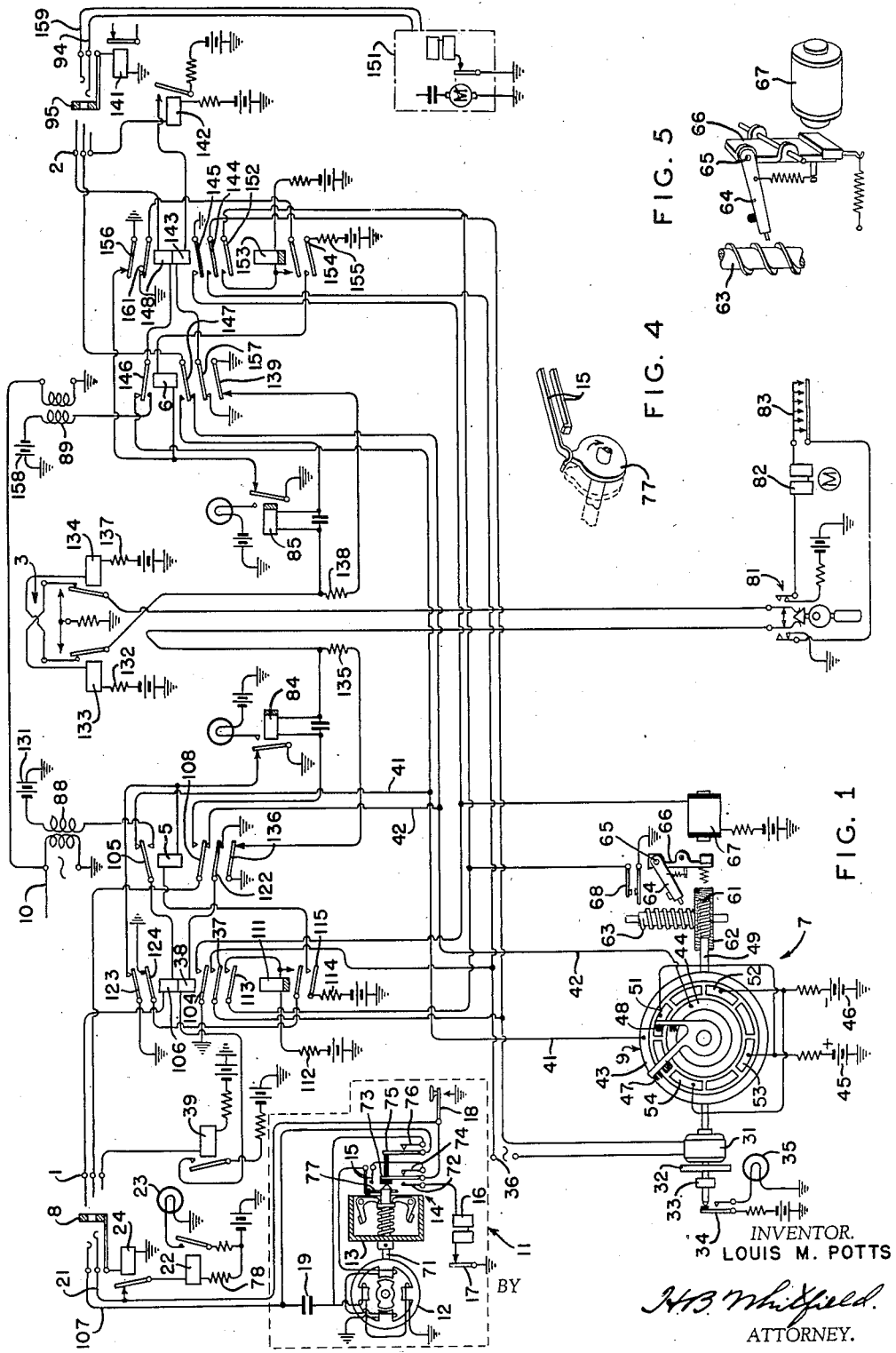
INVENTOR.
LOUIS M. POTTS
H.B. Whitfield
ATTORNEY.

April 8, 1941.　　　　L. M. POTTS　　　　2,237,951
MOTOR CONTROL AND PHASING
Filed July 3, 1937　　　　2 Sheets-Sheet 2
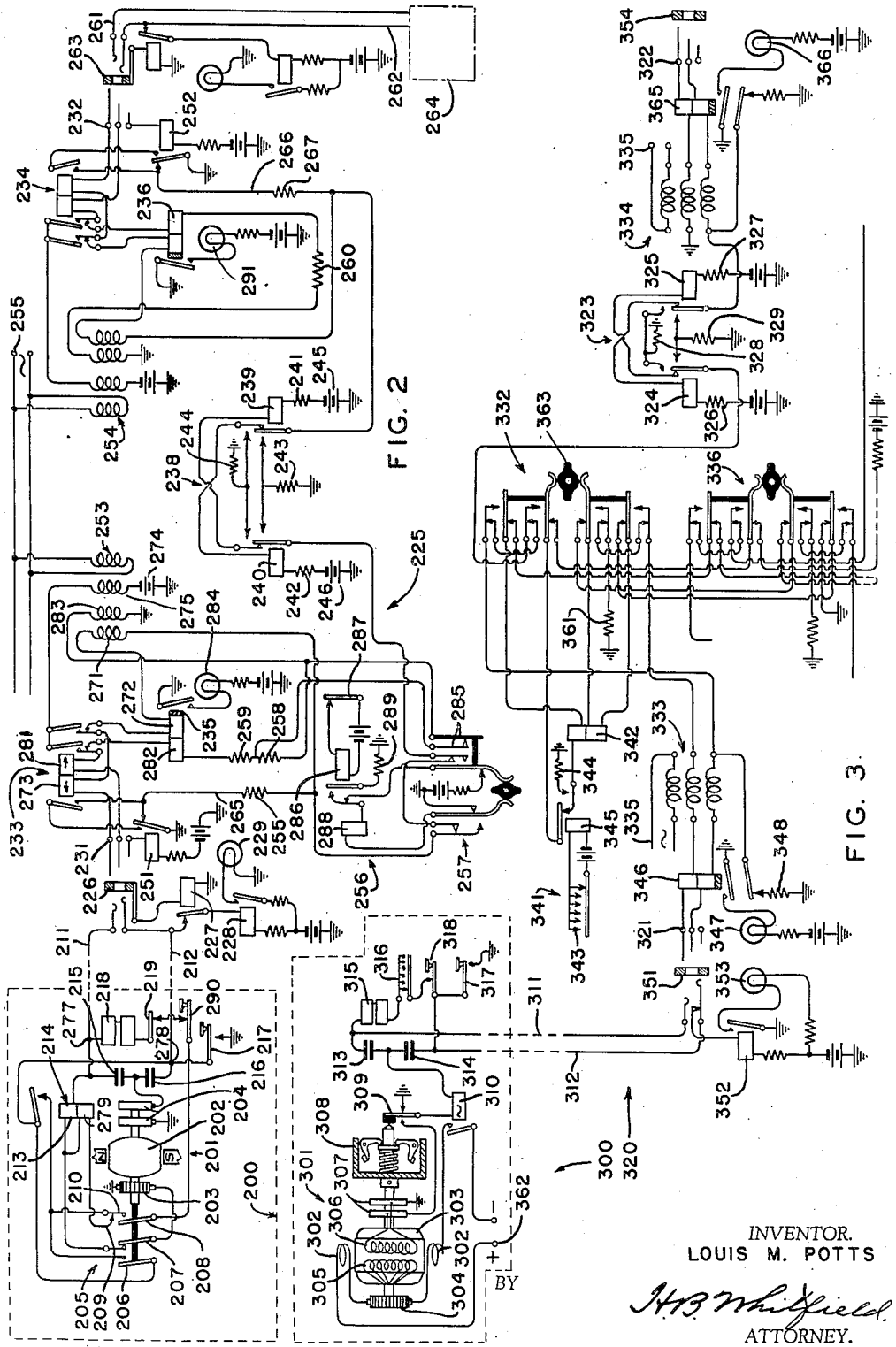
INVENTOR.
LOUIS M. POTTS
BY
ATTORNEY.

Patented Apr. 8, 1941

2,237,951

UNITED STATES PATENT OFFICE 2,237,951

MOTOR CONTROL AND PHASING

Louis M. Potts, Evanston, Ill., assignor to Teletype Corporation, Chicago, Ill., a corporation of Delaware Application July 3, 1937, Serial No. 151,827

13 Claims. (Cl. 172—275)

The present invention pertains to telegraphic communication systems and more particularly to telegraph systems involving a plurality of substations arranged upon a plurality of radial lines which connect a central office with the substations which are provided with telegraph apparatus having a driving motor normally inert.

An object of this invention is to maintain synchronism of a substation driving motor by the use of alternating currents transmitted from a central office over a communication line but independently of communication signals transmitted over the line.

A feature of the invention is the provision of means associated with the switching devices at the central office and with the motors of the substations such that a substation motor is started into operation in response to seizure of its connecting line by the central office switching equipment and in which synchronous motors may be started by an alternating current of low frequency which is increased to the full operating frequency of the motor, the motor being thereafter maintained in synchronism by a continuous alternating current supplied over a power circuit or synchronizing circuit which is operatvely independent of communication signals.

Further features reside in provision of means for restarting substation motors automatically, should they have been stopped, in the provision of auxiliary means for supplying power to the substation motor, and in the provision of starting means changeable dependently upon increasing speed of the motor to synchronizing speed.

These objects and features are attained by supplying at the central office embodied in interconnective devices a source of alternating current which supplies the synchronizing power over a power conductor or over the communication conductor or over phantom or composited circuits after a communication condition has been established and over various circuits in the steps of progress toward establishment of the communication condition, and by providing further means in the connective equipment at the central office for supplying an alternating current of varied frequency, this further means also being operative to supply to a line a polyphase current comprising a series of impulses of alternating polarities and of increasing frequency in response to seizure of the line for communication purposes.

A more complete understanding of the invention will be obtained from the following description taken in connection with the accompanying drawings, in which Fig. 1 illustrates a complete equipment of one central office connective unit associated with two line jacks and one substation;

Fig. 2 illustrates a modification embodying a self-starting substation motor with automatic starting switches and circuits;

Fig. 3 illustrates a central office connective unit and a substation having a synchronous motor with an auxiliary source of power;

Fig. 4 illustrates cam 77 of Fig. 1; and

Fig. 5 illustrates pivoted armature lever 66 of Fig. 1.

In Fig. 1, a connective pair of plugs 1 and 2 are connected for communication through a repeater relay set 3 when relays 5 and 6 are energized, and the circuits of the connective plugs also include inductive association with a source of alternating current when connective relays 5 and 6 are energized. Prior to energization of relays 5 and 6 respectively, the switching plugs 1 and 2 are connected to output conductors of a generator 7 which normally is at rest, but which is energized to start into rotation when plug 1 or plug 2 is inserted into a line jack such as 8. The generator 7 then delivers to line conductors associated with the line jack and plug, a polyphase current comprising two concurrent series of alternating current impulses generated by its commutator 9, the frequency of which increases as the speed of the generator 7 increases, until this increasing frequency attains the frequency of the alternating current source 10 after which relay 5 is operated to switch the conductors of plug 1 through to the alternating current source 10 and to the repeating relay set 3.

At substation 11, a synchronous motor 12 is provided with a centrifugal device 13 having a switch 14 with a plurality of contacts which are shown in contactual relations of their condition of rest. The centrifugal device has also a cam contact 15 which is operated by a rotating cam 77 effective at low speeds of motor 12 as shown in solid line in Fig. 4, but withdrawn as shown in dotted line, by the centrifugal device 13 when motor 12 is rotated at higher speeds. A printer selector magnet is symbolized at 16, a permutation code signal transmitter is symbolized at 17, a calling key is illustrated at 18, and a condenser 19 is included in an alternating current power circuit of motor 12 to prevent operation of series relay winding 106.

At the central office, the radial substation communication line 21 is provided with a switching jack 8 and a signaling line relay 22 which has a line lamp 23 and a cut-off relay 24. Specific circuits for the described apparatus will be identified and traced in description of operation of the system.

Generator 7 comprises a self-starting alternating current motor 31 having flywheel 32 to retard acceleration and centrifugal device 33 similar to device 13 which controls a centrifugal switch 34 to energize a signal lamp 35. Motor 31 is supplied with power from a source 36 under control of an armature 37 of relay 38 energized by control of sleeve relay 39 which is responsive over an obvious circuit to insertion of plug 1 into jack 8.

Variable generator 7 has output conductors 41 and 42 connected respectively to outer ring 43 and inner ring 44 of the commutator 9. Positive battery 45 and negative battery 46 supply current to the commutator 9 which by insulated brushes 47 and 48, carried by arms on motor shaft 49, connects the said batteries in sequential manner to the output conductors 41, 42 by engagement with the short commutator segments 51, 52, 53, and 54. When the commutator brushes are in positions shown, a circuit path will be formed through positive battery 45, segment 51, brush 48, ring 44, and conductor 42. When brushes 47 and 48 shall have moved through an angle of 45°, brush 48 will disengage from the segment 51 and will rest upon an isolated segment while brush 47 will engage segment 51 to form a circuit path through positive battery 45, segment 51, brush 47, ring 43, and conductor 41. When the brushes shall have moved 90° from the position shown, brush 48 will engage segment 52 forming a circuit path through negative battery 46, segment 52, brush 48, ring 44, and conductor 42. When the brushes shall have moved 135° from the position shown, brush 47 will engage segment 52 forming a circuit path through negative battery 46, segment 52, brush 47, ring 43, and conductor 41. This sequence of four electrical impulses will be repeated through segments 53 and 54 resulting in repeated cycles each comprising a positive impulse on conductor 42 followed by a positive impulse on conductor 41 followed by a negative impulse on conductor 42 followed by a negative impulse on a conductor 41, completing the cycle.

Lamp 35 glows when motor 31 is rotating at any speed. Shaft 49 carries a worm 61 engaging a gear 62 upon a snail 63 whose follower 64, pivoted at 65 upon a pivoted armature lever 66 of snail magnet 67, engages the snail when magnet 67 is energized and is driven by the snail to engage and close contact members 68, see also Fig. 5. In operation, motor 31 is started by armature 37 of relay 38 and rotates for a counted number of revolutions as determined by snail 63 before the operation of closing the contacts 68.

At substation 11, motor 12 comprises a permanently polarized two-pole rotor and a fixed field structure having four polar field faces with four windings connected serially in pairs. Mounted on the rotor shaft 71 is a centrifugal device 13 controlling a switch 14 which comprises contact members 72 to 76 inclusive, and having further a rotary cam 77 controlling a switch 15. A correcting circuit including grounded battery, resistor 78, winding of relay 22, contact of relay 24, line conductor 21, contact members 73, 74, cam switch 15 when closed, and two field windings of motor 12, will supply to motor 12 a current sufficient to turn the rotor into that angular position wherein cam 77 opens cam switch 15, thus interrupting the described circuit. Cam switch 15 determines the angular stopping position of the rotor, thereby effecting its purpose of opening the line 21 after removal of plug 1 from jack 8 so that key 18 may be used for signaling.

An operator key 81 is connected to include into the communicative circuit of the plugs 1 and 2 an operator set comprising recorder 82 and transmitter 83. During a connection between two lines, slow-to-release relays 84 and 85 hold their armatures attracted in response to signaling currents of communicative nature through the plugs 1 and 2. Induction coils having primary windings connected to a common alternating current source 10 have also secondary windings 88, 89, which supply alternating current to the circuits of the lines connected to plugs 1 and 2 for purpose of synchronizing and driving substation motors 12 over circuits to be described.

Operation of the structure illustrated in Fig. 1 is as follows: An operator at substation 11 desiring to transmit a message to a substation on line 94 connected to line jack 95 will operate the calling key 18 to close a calling circuit including grounded battery, resistor 78, winding of relay 22, contacts of relay 24, line conductor 21, key 18, and ground, thus energizing relay 22 to illuminate lamp 23 over an obvious circuit, and thereby producing a visible signal to attract attention of a central office operator serving this line.

The central office operator awaits termination of the lamp signal and then responds by inserting plug 1 into jack 8 which closes an obvious sleeve circuit of the jack including windings of relays 39 and 24. Relay 24 energizes to prevent reenergization of relay 22 and to clear conductor 21 for transmission purposes. Relay 39 energizes, and by its armature contacts energizes relay 38 over an obvious circuit. Relay 38 attracts its armatures and armature 104 energizes snail magnet 67 over an obvious circuit while armature 37 closes an alternating current power circuit for motor 31 which begins to rotate and continues rotation with increasing speed.

Soon after beginning of rotation, centrifugal switch 34 closes an energizing circuit for lamp 35. Generator 7 now supplies a varying polyphase current comprising alternating potentials of increasing frequencies to the output conductors 41, 42, which now supply current to motor 12 over two paths as follows: With brushes 47, 48 in position shown, a circuit path extends from positive battery 45, through segment 51, brush 48, ring 44, output conductor 42, armature 108 of relay 5, ring members of plug 1 and jack 8, line conductor 21, and switch contacts 73, 74 to the open cam contact 15. Brushes 47 and 48 may start from any angular position of shaft 49. When brushes 47 and 48 reach a position 45° clockwise from the position shown, a circuit is formed from positive battery 45, through segment 51, brush 47, ring 43, output conductor 41, back contact and armature 105 of relay 5, line winding 106 of relay 38, tip members of plug 1 and jack 8, line conductor 107, contact members 75, 76, and two field windings of motor 12 to ground, energizing motor 12 to turn its rotor through 90°, thus closing cam switch 15. This is followed by current over a circuit including negative battery 46, segment 52, brush 48, ring 44, output conductor 42, back contact and armature 108 of relay 5, ring members of plug 1 and jack 8, line conductor 21, contact members 73, 74, closed cam contacts 15, and two field windings of motor 12 to ground, energizing motor 12 to turn its rotor a further 90°. Further rotation of the brushes of commutator 9 form a circuit from negative battery 46, segment 52, brush 47, ring 43, output conductor 41, back contact and armature 105 of relay 5, line winding 106 of relay 38, tip members of plug 1 and jack 8, line conductor 107, contact members 75, 76 and two field windings of motor 12 to ground, energizing motor 12 to turn its rotor through an additional 90°. This is followed by current over a circuit including positive battery 45, segment 53, brush 48, ring 44, output conductor 42, armature 108 of relay 5, ring members of plug 1 and jack 8, line conductor 21, contact members 73, 74, closed cam switch 15, since cam 17 now is 90° from its operating angle, and two field windings of motor 12 to ground, producing a field magnetization in motor 12 which will advance the rotor a further 90° completing one revolution of the motor 12. In the second half of the revolution of commutator 9, segments 53 and 54 cooperate with brushes 47 and 48 to repeat impulses of reversing polarity over conductors 41 and 42 and line conductors 107 and 21 to repeat the cycle of the rotor of motor 12 and this cycle of polyphase motor starting current is repeated with increasing frequency until the frequency of currents upon conductors 41, 42 equals or exceeds the frequency of currents obtainable from source of alternating current power 10, and the speed of rotation of motor 12 equals or exceeds the speed obtainable from the alternating current power source 10.

Should the brushes of generator 7 start from any position other than the position shown, the described starting of motor 12 will be delayed by a fraction of a cycle only.

As the speed of the rotor of motor 12 approaches the speed of the alternating current power source 10, the centrifugal device 13 will operate its switch 14 to reverse the contactual relations of contact members 72 to 76 and will remove cam 77 from engagement with switch 15 as illustrated in dotted line in Fig. 4. By reversal of contact members 72 to 76, an alternating current power circuit for continuous running of motor 12 is set up including batteries 45 and 46 in alternation, segments 51, 52, 53 and 54 in rotation, brush 47, ring 43, output conductor 41, back contact and armature 105 of relay 5, line winding 106 of relay 38, tip of plug 1, short spring of jack 8, line conductor 107, condenser 19, and two field windings of motor 12 to ground. Remaining windings of motor 12 are not used after starting, their circuit path being open at contact 74.

At the same time, by operation of centrifugal switch 14, a telegraphic signaling path is formed including batteries 45 and 46 in alternation, segments 51, 52, 53, and 54 in rotation, brush 48, ring 44, output conductor 42, back contact and armature 108 of relay 5, ring of plug 1, long spring of jack 8, line conductor 21, switch contacts 73, 72, telegraph receiver magnets 16 and telegraph transmitter 17 to ground. The telegraph receiver 16 may operate irregularly.

Soon thereafter, snail follower 64 engages and closes snail contact members 68, thus completing a circuit for energization of snail relay 111 including grounded battery and resistor 112, winding of relay 111, armature 113 of energized relay 38, and contact members 68 to ground. Relay 111 operates its armatures and energizes relay 5 over a circuit including battery and resistor 114, armature 115 and contact of relay 111, winding of relay 5, and back contact and armature of unenergized relay 84 to ground. Relay 5 operates its armature 122 to interrupt the energizing circuit of relay 38 while its armature 108 forms an energizing circuit for slow-to-operate relay 84, the relay 38 releasing quickly to close an alternative ground connection through armature 123 for the described circuit of the winding of relay 5 before the slow-to-operate relay 84 has operated its armature to interrupt the original energizing ground contact just described for relay 5. Also, by its armature 124, deenergized relay 38 forms a holding circuit for relay 111 including grounded battery, resistor 112, winding and contacts of energized relay 111, armature 124 and ground. Also, by release of its armature 104, relay 38 interrupts the energizing circuit of snail magnet 67 causing release of pivoted armature 66 which withdraws snail follower 64 from snail 63 whereupon the follower is retired by its spring and permits contact members 68 to separate. Also, by release of its armature 37, relay 38 interrupts the power circuit of motor 31, the motor stops and lamp 35 is extinguished, thus placing generator 7 in condition to operate again in response to insertion of plug 2 into jack 95.

By energization of relay 5, a definitive alternating current power circuit has been formed for motor 12 including grounded battery 131, induction coil winding 88, front contact and armature 105, line winding 106 of relay 38, tip members of plug 1 and jack 8, line conductor 107, condenser 19, and two windings of motor 12 to ground. No direct current flows because of condenser 19 hence relay 38 is not energized. A definitive telegraphic communication circuit also has been formed by operation of relay 5 including grounded battery, resistor 132, winding of repeating relay 133, contact and armature of energized repeating relay 134, contacts of operator key 81, winding of relay 84, front contact and armature 108, ring members of plug 1 and jack 8, line conductor 21, contact members 73, 72, selector magnets 16 of a recording receiver and contacts of permutation transmitter 17 to ground. In this circuit, a central office operator may include magnets 82 of a recording receiver and contacts 83 of a permutation transmitter by means of key 81.

In the circuits of repeating relay set 3, preliminary energizing conditions for the repeating relays 133 and 134 have been provided by two preliminary circuits, one circuit including grounded battery, resistor 132, winding of relay 133, contact and armature of energized relay 134, contacts of manual switch 81, resistor 135, and armature 136 of unenergized relay 5 to ground, and the companion circuit including grounded battery, resistor 137, winding of relay 134, contact and armature of energized relay 133, resistor 138, and armature 139 of unenergized relay 6 to ground. In the circuits of the repeating relay set 3 as now established, energization of relay 5 interrupts the described preliminary energizing circuit of relay 133 and substitutes the definitive telegraphic communication circuit described above.

The central office operator, having operated key 81, having communicated with calling substation 11, and having ascertained that the operator at substation 11 desires to be connected to line 94, now establishes the connection by inserting plug 2 in line jack 95, which results in energizing relays 141 and 142 over the sleeve circuit of jack 95. Operation of the armature of relay 142 corresponding to relay 39 of plug 1 energizes relay 143 corresponding to relay 38 of plug 1.

Relay 143 by armature 144 energizes motor 31, and by armature 145 energizes snail magnet 67 so that generator 7 again starts and delivers current from its output conductors 41, 42 through back contacts and armatures 146, 147, of relay 6 and winding 148 of relay 143 to plug 2 and to the line conductors 94 and 159 and substation 151 associated with jack 95. In response to this starting current of varied frequency, the motor at the substation 151 is started and operates its centrifugal device corresponding to 13 of substation 11. Snail follower 64 closes snail contacts 68, thus completing a circuit through armature 152 of relay 143 to energize snail relay 153 whose armature 154 responsively closes a circuit through grounded battery, resistor 155, armature 154 of relay 153, winding of relay 6, and armature of relay 85 to ground to energize relay 6, which by armature 139 opens the described preliminary energizing circuit of repeating relay 134, by armature 157 interrupts the energizing circuit of relay 143, and by back contacts and armatures 146, 147 interrupts the circuits of output conductors 41, 42 of generator 7, while by front contact and armature 146, it forms a definitive alternating current power circuit including grounded battery 158, induction coil secondary winding 89, front contact and armature 146 of relay 6, winding 148 of relay 143, tip of plug 2, short spring of jack 95, line conductor 159 to substation 151, and through condenser and motor to ground as in substation 11, and by front contact and armature 147, the relay 6 forms a definitive telegraph communication circuit including grounded battery, resitsor 137, winding of repeating relay 134, contacts of energized repeating relay 133, winding of slow-to-operate relay 85, front contact and armature 147, ring of plug 2, long spring of jack 95, line conductor 94 to substation 151 and through receiving and recording apparatus to ground as in substation 11.

Armature 157 deenergizes relay 143, armature 146 supplies alternating current but does not energize relay 143 to hold its armatures. Accordingly, relay 143 releases its armatures. Armature 156 provides ground for the winding of relay 6 before slow-to-operate relay 85 opens its ground connection, armature 161 forms a holding circuit for relay 153, while armatures 144, 145 open their circuits to deenergize motor 31 and snail magnet 67, thus stopping the motor 31, extinguishing lamp 35 and restoring arm 64.

The two substations, both illustrated by details shown in substation 11, are now in communication over the circuits described by means of repeating relay set 3, and the motors thereof are maintained at exact speed by currents derived from alternating source 10 and distributed to the substations over the described alternating current power circuits.

Relays 84 and 134 now are energized by communication signaling currents of marking nature flowing to substation 11 through jack 8, while relays 85 and 133 are energized by similar currents through jack 95. Relays 24, 39, 141, and 142 are held energized by sleeve circuits of plugs 1 and 2. Relays 5 and 6 are held energized by individual holding circuits under control of contacts in unenergized relays 38 and 143 respectively.

Means is provided for restarting automatically a stopped substation motor during communicative condition. Should either substation motor or both of them for any cause as by a line fault become out of phase with its power source 10 or for any other reason come to rest, or if the motor should slow down to a speed below that necessary to keep the centrifugal device 13 operated, contacts 75, 76 will shunt the condenser 19. This will permit direct current from battery 131 to flow through the power circuit described, resulting in energization of relay 38 to attract its armatures which will set up the starting conditions of generator 7 with release of relay 5, so that output conductors 41, 42 again will deliver to motor 12 polyphase currents of increasing frequency to bring the motor again into phasing speed with the source 10 when the centrifugal device 13 and the snail contact 68 again will function to energize relay 5 or 6 and deenergize relay 38 or 143, thus restarting the substation motor and reestablishing the communicative condition.

There are provided a plurality of complete equipments of generator 7 and motor 31, one for each connective pair of plugs, one such pair being illustrated by plugs 1, 2.

Referring to Fig. 2, the system therein illustrated utilizes for driving the telegraph apparatus at the substation a motor in which there is provided a permanent field and a distributed winding with a segmented commutator, and in which there also are provided collecting rings connected to a further synchronous winding as illustrated in Fig. 3. Direct current for starting the motor is transmitted over the two sides of the line in parallel and subsequently alternating current is transmitted over the two sides of the line in parallel for driving and synchronizing, while telegraphic signaling current is transmitted over the two conductors of the line looped in series.

At the substations 200 and 254, the motor 201 comprises a permanent magnetic field and a rotor 202 having a distributed winding connected to a segmented commutator 203. Collecting rings 204 are connected to a further winding in the rotor. A centrifugal switch 205 operates when the motor is substantially at synchronous speed with source 255 and contains switching elements 206 to 210 which control substation circuits for line conductors 211 and 212. In the illustrated normal position of the centrifugal switch, assumed when the motor is inert, line conductor 211 is connected through winding 213 of relay 214, switching element 207 and commutator 203 to ground. Line conductor 212 is open to direct currents.

Line conductors 211 and 212 are connected through condensers 215 and 216 to brushes of collecting rings 204. A manual key 217 serves to control signal devices at a central office or switching station to attract attention of an operator. Selector magnets 218 symbolize a complete recording receiver, and contacts 219 symbolize a complete code signal transmitter. Circuits for the described apparatus parts will be disclosed in a description of operation of the structure illustrated in Fig. 2.

At a central station 225, equipment for the line 211, 212 comprises a jack 226, a cut-off relay 227, a calling line relay 228, and a calling line lamp 229. A pair of connective plugs 231, 232 are associated together for communication through double wound relays 233, 234, slow-to-release relays 235, 236, and a repeating relay set 238, comprising repeating relays 239, 240, resistors 241, 242, 243, 244, and grounded batteries 245, 246.

Sleeve relays 251 and 252 are included in sleeve circuits of plugs 231 and 232 respectively. Armature members of relays 233 and 234 are associated through repeating coils 253 and 254, respectively, with an alternating current power source 255 having a frequency higher than baud value of permutation code transmission and windings of the same induction coils are included in power circuits and telegraphic communication circuits to be described. An operator's telegraph set 256 may be switched into circuits of the plug pair 231, 232 by means of manual key 257. Resistor 258 balances against the operator set 256, resistor 259 balances against repeating relay 239, and resistor 260 balances against repeating relay 240. A second substation line 261, 262 is indicated in association with jack 263 and substation 264 to duplicate the substation 200. Preparatory energizations of repeating relays 239 and 240 are effected for relay 240 by current over a circuit 265 including grounded battery 245, resistor 241, winding of repeating relay 239, contact and armature of energized repeating relay 240, contacts of manual key 257, resistor 255, circuit conductor 265, back contact and armature of sleeve relay 251, and ground, and for relay 239 over a companion circuit 266 including grounded battery 246, resistor 242, winding of repeating relay 240, contact and armature of energized repeating relay 239, resistor 267, circuit conductor 266, back contact and armature of relay 252, and ground.

Operation of the structure of Fig. 2 is as follows: An operator at substation 200 closes the manual key 217 thereby energizing signal lamp relay 228 over a calling circuit including grounded battery, resistor, winding of line relay 228, contacts of cut-off relay 227, line conductor 212, key 217 and ground. Contacts of energized relay 228 cause illumination of lamp 229 over an obvious circuit.

An operator at the central office 225 awaits cessation of the illumination of lamp 229, then inserts plug 231 into jack 226, energizing sleeve relay 251 and cut-off relay 227 over an obvious circuit. Energization of sleeve relay 251 opens circuit 265 and thereby interrupts the described preparatory energization of repeating relay 239 whose deenergization changes the energizing circuit of repeating relay 240 from the described preparatory circuit 266 to a holding circuit including ground, resistor, winding of repeating relay 240, make-before-break contacts of deenergized repeating relay 239, resistor 244, and ground.

Insertion of plug 231 also results in energization of relays 214, 233, 235, and reenergization of relay 239 over a line circuit of first response including grounded battery, resistor 241, winding of repeating relay 239, contact and armature of energized repeating relay 240, contacts of manual key 257, induction coil winding 271, winding 272 of relay 235, make-before-break contacts of relay 233, winding 273 of relay 233, tip of plug 231, short spring of jack 226, line conductor 211, winding 213 of relay 214, contact and switch member 207, commutator 203, and ground. Operation of relays 214 and 233 interrupt the described line circuit of first response and substitute two parallel motor starting circuits each carrying direct current from battery 274 as a source of motor starting current and carrying also alternating current from induction coil winding 275 as a source of motor synchronizing current. The parallel motor starting circuits extend for both classes of current from ground, through battery 274, induction coil winding 275, both of the make-before-break armatures and long contact members of operated relay 233, both windings of relay 233, tip and ring of plug 231, both springs of jack 226, and both line conductors 211 and 212 to junctions 277, 278 respectively at substation 200, extending thence for alternating currents through condensers 215, 216, collecting rings 204 and ground, and extending for direct currents from junction 277, through an energizing winding 213 of relay 214, contact and switch member 207 and commutator 203 to ground, also from junction 278, through contacts of energized relay 214, switch contacts 210, 209, winding 279 of relay 214, contact and switch member 207 and commutator 203 to ground. Direct currents start the rotor 202 and drive it with increasing speed until synchronism with source 255, through induction coil winding 275, is approximated whereupon torque derived from alternating currents through rings 204 will supplement torque derived from direct current through commutator 203, the rotor will attain synchronism, and centrifugal switch 205 will due to its predetermined speed adjustment, be operated.

Operation of centrifugal switch 205 removes all conductive ground for direct current from line conductors 211, 212 at substation 200, whereupon direct current ceases in windings of relays 214 and 233 and those relays are deenergized, resulting in establishment of a first communication circuit and of definitive parallel alternating current power circuits. The first communication circuit includes grounded battery 245, resistor 241, winding of repeating relay 239, contact and armature member of repeating relay 240, contacts of manual key 257, induction coil winding 271, winding 272 of relay 235, make-before-break contacts and winding 273 of relay 233, tip of plug 231, short spring of jack 226, line conductor 211, junction 277, windings of selector magnet 218, contacts of code transmitter 219, break key 290, centrifugal switch member 208 and its long contact spring 210, contact and switch member 206, junction 278, line conductor 212, long spring of jack 226, ring of plug 231, winding 281 and make-before-break contacts of relay 233, winding 282 of relay 235, resistor 259 (to balance winding of relay 239), closed contacts 285 of manual key 257, induction coil winding 283, and ground. Differential relay 233 is not energized. Relay 235 is energized and closes an obvious circuit to illuminate lamp 284 to indicate to an operator at set 256 that the described circuit has been completed. The definitive synchronizing power circuits extend from ground, through induction coil winding 283, closed contacts 285 and resistor 259, to winding 282 of relay 235, and from grounded battery 245, through resistor 241, winding of repeating relay 239, contact and armature of energized repeating relay 240, contacts of manual key 257, and induction coil winding 271 to winding 272 of relay 235, thence through windings of relay 235, through make-before-break contacts of deenergized relay 233, windings of relay 233, tip and ring elements of plug 231 and jack 226, line conductors 211 and 212, condensers 215 and 216, then uniting and continuing through collecting rings 204 to ground. Relay 233 is magnetized to an insufficient degree by the transmitted alternating power current, and its armature members are not operated.

The paths for alternating current constitute a phantom channel upon the line 211—212 which is operatively independent of transmission of telegraphic signals over the described telegraph communication circuit, in which signals are originated at substation 200 by substation transmitter 219, and at central station 225 by contacts of repeating relay 240 or by contacts of transmitting relay 286 responsive to transmitter 287 in operator's set 257. When contacts of repeating relay 240 are operated, resistor 243 is substituted for winding of relay 239, resistor 241 and battery 245 in one side of the phantom circuit, maintaining both its conductive continuity and its resistance value but eliminating battery to produce a spacing telegraphic signal while maintaining the power circuit effectively unchanged. Resistor 259 is included in series in one side of the phantom circuit of plug 231 to balance resistor 241 and winding of relay 239 in the other side of the phantom circuit of plug 231, while resistor 260 is included in series in one side of the phantom circuit of plug 232 to balance resistor 242 and winding of relay 240 in the other side of the phantom circuit of plug 232. When manual key 257 is operated to include operator's set 256 and its selector magnet 288 in the telegraph communication circuit and, therefore, in one side of the phantom circuit of plug 231, its contacts 285 open a shunt thereby to include a balancing resistor 258 in the other side of the phantom circuit of plug 231 to maintain balance between the two sides and then when transmitting relay 286 is operated with key 257 in reversed condition, a resistor 289 to ground is substituted for winding of relay 239, resistor 241, and battery 245 to ground.

Having inserted plug 231 into jack 226 in manual response to illumination of signal lamp 229, a switching operator awaits illumination of signal lamp 284 which will not become energized until after the connected substation motor 201 has attained its synchronous speed with resultant deenergization of relay 233 and energization of relay 235. Key 257 then may be operated, thus connecting set 256 and substation 200 for communication, and the switching operator may complete a communicative connection between two substations by inserting plug 232 into any substation jack 263. After a cycle of operation to start the motor at substation 264, relay 236 will be energized and lamp 291 will be illuminated, the two lamps 284 and 291 then functioning to advise the switching operator that the two substations 200 and 264 are connected and conditioned for communication. Either station may operate a break key 290 to control relay 235 or 236 to flash lamp 284 or 291 intermittently to attract attention of the operator.

Referring to Fig. 3, a structure is disclosed in which local substation power either direct current or alternating current is supplied to energize the substation motor and in which the local power is supplemented by alternating current from a central power supply which is transmitted over the phantom circuit of the line for synchronization only. Local power at the substation is applied under control of the transmitted central power through a relay responsive to alternating currents received over the phantom from the central office.

At substation 300, a driving motor 301 comprises field 302, rotor 303, commutator 304, and distributed winding 305 for driving the motor by direct or alternating current, also a further rotor winding 306 and collecting rings 307 for driving the motor by alternating current. The motor is provided also with a centrifugal switch member 308 and electrical switch 309 which is operated when the motor reaches its synchronous speed and remains operated throughout the ensuing communication. A motor control relay 310 has its contact and armature connected in the local power circuit of the motor and when energized, closes the circuit of the local current winding of the rotor. Line conductors 311 and 312 are connected through condensers 313 and 314 to winding of relay 310 and through centrifugal switch 309 and its contact to ground. Selector magnets 315 representing a recording receiver and contacts 316 representing a code signal transmitter are bridged permanently from conductor 311 to conductor 312. A manual calling key 317 is connected between conductor 312 and ground. A break key 318 is provided.

At the central office 320, a pair of connective plugs 321 and 322 are connected together through a repeating relay set 323, comprising repeating relays 324 and 325 and resistors 326, 327, 328, and 329. Included also between plugs 321 and 322 are a manual key 332 and two induction coils 333 and 334 whose primary windings are associated with a source of alternating current 335, appearing at several points in the drawing and bearing the same reference numeral at all occurrences.

Keys 332, 336 are associated by circuits with an operator set 341 comprising a double-wound selector magnet 342, a code transmitter 343, a resistor 344, transmitting relay 345 having make-before-break contacts. Plug 321 also is provided with a double-wound relay 346, a signal lamp 347, and a resistor 348. It is intended that the plug 322 be similarly equipped.

Line 311—312 has central office equipment comprising a jack 351, a calling relay 352, and a calling lamp 353. Jack 354 represents another complete line structure similar to jack 351 and line 311—312. Preparatory circuits for energization of repeating relays 324 and 325 include grounded battery, resistor 327, winding of repeating relay 325, contacts of repeating relay 324, contacts of key 332, contacts of relay 345 and resistor 343 to ground, also battery, resistor 326, winding of relay 324, contacts of relay 325, contact of double-wound relay 365, and resistor to ground.

In operation, closure of key 317 energizes calling relay 352 and calling lamp 353 over obvious circuits. An operator at the central office responds by inserting plug 321 into jack 351, thereby forming circuits for both direct current and alternating currents. For direct current, the circuit includes grounded battery, resistor 327, winding of repeating relay 325, contacts of energized repeating relay 324, contacts of key 332, a lowest winding of induction coil 333, lower winding of relay 346, ring of plug 321, long spring of jack 351, line conductor 312, break key 318, normally closed contacts of permutation transmitter 316, recorder magnets 315, line conductor 311, short spring of jack 351, tip of plug 321, upper winding of relay 346, middle winding of induction coil 333, contacts of key 332, and resistor 361 to ground, energizing relay 346 which closes an obvious circuit to illuminate lamp 347.

For alternating currents, a circuit includes grounded battery, resistor 327, winding of relay 325, contacts of relay 324, contact of key 332, lowest winding of induction coil 333 as a source of alternating current, lower winding of relay 346, ring of plug 321, long spring of jack 351, line conductor 312, condenser 314, alternating current relay 310, and switch 309 to ground, also a companion circuit includes ground, resistor 361, contacts of key 332, middle winding of induction coil 333 as a source of alternating current, upper winding of relay 346, tip of plug 321, short spring of jack 351, line conductor 311, condenser 313, alternating current relay 310, and switch 309 to ground, thus energizing relay 310 whose contacts connect commutator 304 and rotor winding 305 to a source of current 362. The rotor 303 starts under energy received from source 362 and when operating speed is reached, the centrifugal switch 309 operates to include the rings 307 and winding 306 in the circuits for alternating currents traced above. Alternating currents over a phantom circuit including conductors 311, 312, and earth now synchronize the rotor 303, and communication may be effected. The phantom circuit is balanced at substation 300 by matched condensers 313 and 314, and at central office 320 by two windings of relay 346, by two secondary windings of induction coil 333 and by resistor 361 balanced against resistor 327 and winding of repeating relay 325.

An operator at central office 320 now may operate key 332 by rotating a cam 363 through an angle of 90°, thereby connecting receiver magnet 342 into the described line and phantom circuits in balanced manner and including also contacts of transmitting relay 345. Thereafter, communication may proceed between operator set 341 and substation 300. Opening the contacts of transmitter 316 to produce a spacing signal does not unbalance the phantom circuit, and opening the contacts of transmitter 343, to produce a spacing signal, operates relay 345 to substitute resistor 344 in place of resistor 327 and winding of relay 325 thereby maintaining the phantom circuit in balance.

A connection for intercommunication between two substations is completed by inserting plug 322 into jack 354, energizing relay 365 and illuminating lamp 366. At either connected substation, the substation operator may attract attention of the central office operator by opening a break key 318, deenergizing one of the double-wound relays 345 and 365 to extinguish one of the signal lamps 347 or 366. Responsively to operation of a key 318, a lamp may be flashed repeatedly until a central office operator answers.

Other applications of the invention as defined by the appended claims may be made in full or in part as required to practice the invention to any desired extent.

What is claimed is:

1. In a motor control system, a substation motor, a central office, a line connecting said substation to said central office, means comprising a starting circuit at said substation and a line conductor for starting said motor, means comprising a running circuit at said substation and a line conductor for running said motor after starting, means at said substation responsive to the speed of the motor for changing from said starting means to said running means, motor starting means at said central office, motor running means at said central office, and means at the central office responsive to revolution counting means at said central office for changing from said starting means to said running means.

2. In a motor control system, a motor at a substation, a source of alternating current at a central station, a line connected to said motor and extending to said central station, a polyphase generator at said central station, starting circuits for said motor including said polyphase generator and said connecting line, starting means for said polyphase generator, means for connecting said line and motor to said generator while said generator is at rest, and automatic means operating to disconnect said line and motor from said polyphase generator after a predetermined number of revolutions of said generator and to connect said line and motor to said alternating current source.

3. In a communication system, a substation, a central station, electrical connections between the substation and the central station, motor driven apparatus at the substation, means including the electrical connections to start the motor, a motor synchronizing circuit, and automatic means effective after the lapse of a time interval predetermined by apparatus wholly at the central office to establish the motor synchronizing circuit.

4. In a telegraph system, a remote station, a central station, a channel connecting said stations, a driving motor at the remote station having a starting and a running condition and connected to said channel, a source of power at said central station for driving said motor, means for connecting said source of power to said channel to effect starting of said motor, means at the central station operated following the starting of said motor for establishing a running condition for said motor, and means responsive to an inert condition of said motor after the establishment of the running condition for reestablishing the starting condition for said motor.

5. In a telegraph system, a central station, a motor at a station remote to said central station having a starting and a running condition, a starting circuit and a running circuit connecting said motor to the central station, means at the central station for changing through said circuits from starting to running condition for said motor by disconnecting said starting circuit and connecting said running circuit, and means operated by the motor upon failure of the motor to maintain a predetermined speed to change from said running condition to said starting condition by reestablishing said starting circuit.

6. In a telegraph system, a central station, a motor at a station remote to said central station having a starting and a running condition, a starting circuit and a running circuit connecting said motor to the central station, means at the central station for establishing over said starting circuit a condition to start said motor, means also at said central station operated in response to a predetermined condition after starting said motor for rendering said starting circuit ineffective and for establishing the running condition for said motor over said running circuit, and a centrifugally operated switch at said motor to interrupt said running circuit and to reestablish said starting circuit upon failure of the motor to maintain a predetermined speed whereby said starting condition is reestablished.

7. In a telegraph system, a central station, a motor at a station remote to said central station having a starting and a running condition, a starting circuit and a running circuit connecting said motor to the central station, means at the central station for changing from starting to running condition for said motor, a relay in said running circuit to interrupt said running circuit, means in said running circuit to prevent the operation of said relay during normal running condition of said motor, and means at said motor responsive to a failure of said motor to maintain a predetermined speed to render said last mentioned means inoperative and to reestablish the starting condition over said starting circuit.

8. In a telegraph system, a central station, a motor at a station remote to said central station having a starting and a running condition, a starting circuit and a running circuit connecting said motor to the central station, means at the central station for changing from starting to running condition for said motor, a relay common to both circuits to interrupt said running circuit and reestablish the starting condition over said starting circuit, a condenser in said running circuit to prevent operation of said relay over said running circuit, a circuit shunting said condenser, and means responsive to a failure of said motor to maintain a predetermined speed on running condition to close said last-mentioned circuit and to operate said relay over said running circuit whereby the starting circuit is reestablished.

9. In a telegraph system, a central station, a motor at a station remote to said central station, a starting circuit and a running circuit connecting said motor to the central station, means at said central station for establishing over said starting circuit a starting condition for said motor, means also at said central station operated in response to a predetermined starting condition for rendering said starting condition ineffective and for establishing a running condition for said motor, means at said motor to interrupt said running circuit and reestablish said starting circuit, and speed responsive means at said motor to render said last-mentioned means operative upon failure of the motor to maintain a predetermined speed under running condition.

10. In a telegraph system, apparatus to be driven, a motor for driving said apparatus, a main source of power for driving said motor, an auxiliary source of power for driving said motor having speed controlling characteristics, a circuit including said auxiliary source of power and means responsive to said source of auxiliary power to connect said main source of power to the motor to start said motor, and means operable when the motor attains a predetermined speed for connecting said auxiliary source of power to said motor.

11. In a telegraph system, apparatus to be driven, a motor for driving said apparatus, a main source of power for driving said motor, an auxiliary source of power having motor speed controlling characteristics for driving said motor, a circuit for interconnecting said auxiliary source of power and said motor, a relay in said circuit responsive to said source of auxiliary power for connecting said main source of power to said motor, and means operable when the motor attains a predetermined speed to connect said auxiliary source of power to said motor.

12. In a telegraph system, a central station, a motor at a station remote to said central station, a starting circuit and a running circuit connecting said motor to the central station, a variable frequency generator in said starting circuit, and means at said central station responsive to a predetermined number of revolutions of said generator to establish a condition whereby said starting circuit is discontinued and said running circuit is establshed.

13. In a telegraph system, a central station, a motor at a station remote to said central station, a starting circuit and a running circuit connecting said motor to the central station, a variable frequency generator in said starting circuit, a third circuit effective to discontinue the starting circuit and to establish the running circuit, and means at said central station responsive to a predetermined number of revolutions of said generator to complete said third circuit and change from the starting to the running circuit.

LOUIS M. POTTS.